(12) United States Patent
Millies et al.

(10) Patent No.: US 11,079,265 B2
(45) Date of Patent: Aug. 3, 2021

(54) AIR MASS FLOW METER

(71) Applicant: CONTINENTAL AUTOMOTIVE GmbH, Hannover (DE)

(72) Inventors: Thomas Millies, Regensburg (DE); Jörg Schindler, Neutraubling (DE); Stephen Setescak, Pentling (DE); Rainer Frauenholz, Pettendorf (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 268 days.

(21) Appl. No.: 16/063,112

(22) PCT Filed: Dec. 7, 2016

(86) PCT No.: PCT/EP2016/080082
§ 371 (c)(1),
(2) Date: Jun. 15, 2018

(87) PCT Pub. No.: WO2017/102500
PCT Pub. Date: Jun. 22, 2017

(65) Prior Publication Data
US 2018/0372521 A1 Dec. 27, 2018

(30) Foreign Application Priority Data
Dec. 16, 2015 (DE) .......................... 102015225358.9

(51) Int. Cl.
| G01F 1/684 | (2006.01) |
| G01F 1/86 | (2006.01) |
| G01F 15/18 | (2006.01) |
| G01F 5/00 | (2006.01) |

(52) U.S. Cl.
CPC ............ G01F 1/6842 (2013.01); G01F 1/684 (2013.01); G01F 1/6845 (2013.01); G01F 1/86 (2013.01); G01F 5/00 (2013.01); G01F 15/18 (2013.01)

(58) Field of Classification Search
CPC ...... G01F 1/6842; G01F 1/684; G01F 1/6848; G01F 1/86
USPC ..................................................... 73/204.22
See application file for complete search history.

(56) References Cited

U.S. PATENT DOCUMENTS

| 6,553,829 B1 | 4/2003 | Nakada et al. |
| 2013/0139584 A1* | 6/2013 | Qasimi ..................... G01F 5/00 73/204.21 |
| 2015/0096360 A1 | 4/2015 | Tagawa et al. |

(Continued)

FOREIGN PATENT DOCUMENTS

| CN | 1130941 | 9/1996 |
| CN | 101680792 | 3/2010 |
| CN | 103389134 | 11/2013 |

(Continued)

*Primary Examiner* — John Fitzgerald
*Assistant Examiner* — Rodney T Frank
(74) *Attorney, Agent, or Firm* — Cozen O'Connor (57) ABSTRACT

An air mass flowmeter with a housing having an air-guiding path in which an air mass sensor element is arranged on a sensor element carrier in the housing and is electrically connected to a circuit carrier by connection wires. The circuit carrier is also arranged in the housing the air mass sensor element is positioned accurately in the air-guiding path by a positioning element that engages into a positioning element receptacle formed in the sensor element carrier.

21 Claims, 10 Drawing Sheets (56) References Cited

U.S. PATENT DOCUMENTS

2015/0184235 A1* 7/2015 Reda ................ B01L 3/502715
                                                         506/9
2015/0204234 A1* 7/2015 Bauer ................ F02B 29/0462
                                                         60/599

FOREIGN PATENT DOCUMENTS

| CN | 105026897 | 11/2015 |
|----|-----------|---------|
| DE | 44 07 209 | 9/1995 |
| DE | 44 26 101 | 1/1996 |
| DE | 100 31 879 | 4/2001 |
| DE | 10 2004 036 084 | 3/2005 |
| JP | 2001-124604 | 5/2001 |
| JP | 2004-505235 | 2/2004 |
| JP | 3514666 B2 | 3/2004 |
| JP | 2009-085855 | 4/2009 |
| JP | 2010-204005 | 9/2010 |
| JP | 2011-122984 | 6/2011 |
| JP | 2012-242298 | 12/2012 |
| JP | 2015-17857 | 1/2015 |
| WO | WO 02/08701 | 1/2002 |
| WO | WO 2002/010694 | 2/2002 |
| WO | WO 2002/066937 | 8/2002 |
| WO | WO 03089884 | 10/2003 |

* cited by examiner

AIR MASS FLOW METER

CROSS REFERENCE TO RELATED APPLICATIONS

This is a U.S. national stage of application No. PCT/EP2016/080082, filed on Dec. 7, 2016. Priority is claimed on German Application No. DE102015225358.9, filed Dec. 16, 2015, the content of which is incorporated here by reference.

BACKGROUND OF THE INVENTION

1. Field of the Invention

The invention relates to an air mass flowmeter with a housing that has an air-guiding path in which an air mass sensor element is arranged.

2. Description of the Prior Art

Air mass flowmeters are used, for example, in motor vehicles to determine the air mass drawn in by an internal combustion engine. It is possible, on the basis of information about a drawn-in air mass, which is as reliable as possible, for combustion to be optimized by an electronic controller of the internal combustion engine such that a quantity of fuel, which is matched exactly to the air mass, is fed to the respective combustion chambers. As a result, a better utilization of energy with reduced pollutant emissions is thereby achieved.

DE 44 07 209 A1 discloses an air mass flowmeter that is inserted into an intake duct in order to determine an air mass, wherein a defined fraction of the entire flow flows through the air mass sensor. For this purpose, said flowmeter is in the form of an insertion-duct air mass flowmeter. The air mass flowmeter comprises a sensor element arranged in a measurement duct, electronics arranged in a housing and serving for evaluating and/or detecting the measurement values of the sensor element, and an outlet duct beyond the sensor element. For a space-saving arrangement, the ducts or air-guiding paths are of U-, S- or C-shaped form, and so a device which is compact overall and in the form of an insertion element is formed.

An air mass flowmeter which is formed according to the teaching of WO 03/089884 A1 and which is in the form of a hot-film anemometer has proven itself in principle.

In the development of modern air mass flowmeters which operate on the basis of sensor elements which are in the form of microelectromechanical systems (MEMS), it has been found that the measurement results which the sensor element delivers depend substantially on very accurate positioning of the sensor element in the air-guiding path.

SUMMARY OF THE INVENTION

An object of one aspect of the invention is to specify an air mass flowmeter with a sensor element, in which the air mass sensor element is positioned highly accurately in the air-guiding path in a simple and inexpensive manner.

According to one aspect of the invention, on the housing of the air mass flowmeter, there is formed a positioning element that engages into a positioning element receptacle, which is formed in the sensor element carrier, as a result of which the air mass sensor element is positioned precisely in the air-guiding path. Alternatively, according to the invention, on the sensor element carrier, there is formed a positioning element that engages into a positioning element receptacle, which is formed in the housing of the air mass flowmeter, as a result of which the air mass sensor element is positioned precisely in the air-guiding path. The features according to the invention ensure highly accurate positioning of the air mass sensor element in the air-guiding path of the air mass flowmeter.

In particular, the present invention is based on the concept that the positioning element/the positioning element receptacle is provided on the sensor element carrier which, in turn, is fastened to a circuit carrier. Here, the production tolerances of the sensor element carrier are smaller than the production tolerances of the circuit element carrier, and so the exact positioning of the sensor element carrier in the air-guiding path is realized via the sensor element carrier and not via the circuit carrier. Thus, the positioning of the sensor element in the air-guiding path is realized at that component, namely the sensor element carrier, which has smaller production tolerances, as a result of which the positioning accuracy of the sensor element carrier and thus also of the sensor element in the air-guiding path can be improved.

In one configuration, the positioning element is formed integrally with the housing. During the production of the housing, it is possible for the positioning element to be molded on, for example as a peg, at the same time.

In an alternative configuration, the positioning element is formed integrally with the sensor element carrier. During the production of the sensor carrier, it is likewise possible for a peg-like projection to be created as a positioning element.

In one refinement of the invention, the positioning element receptacle is in the form of a bore in the sensor element carrier. Alternatively, the positioning element receptacle is in the form of a bore in the housing. Bores can be placed very precisely and are simple to produce.

In an alternative configuration of the air mass flowmeter according to the invention, the positioning element is of conical form and has a square cross section. The positioning element is thus in the form of a conical square. In such a configuration, it is advantageous if the positioning element receptacle has an opening with a square cross section. Preferably, when the sensor element carrier has been positioned, a press fit is at least partially obtained between the positioning element and the positioning element receptacle, as a result of which the sensor element carrier is positioned in all translational directions.

BRIEF DESCRIPTION OF THE DRAWINGS

Further features and advantageous forms of the invention will be specified below by describing exemplary embodiments with reference to the figures in the drawing. The same terms and reference signs will be used below for identical components throughout the figures, in which.

DETAILED DESCRIPTION OF THE PRESENTLY PREFERRED EMBODIMENTS

Figure 1:
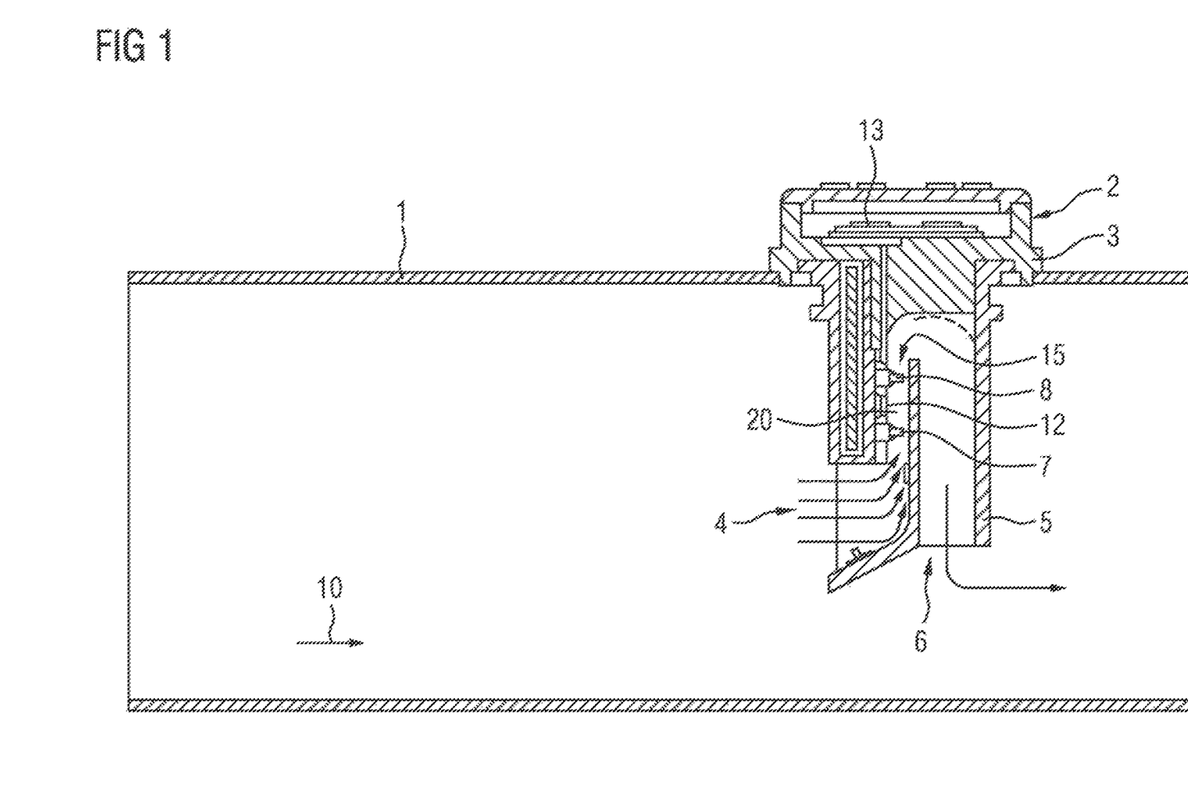
FIG. 1 is an air mass flowmeter.

FIG. 1 shows an air mass flowmeter 2. The air mass flowmeter 2 is in the form of an insertion finger inserted into an intake pipe and fixedly connected to the intake pipe. The intake pipe 1 guides an air mass stream 10 to the cylinders of an internal combustion engine (not illustrated here). For efficient combustion of the fuel in the cylinders of the internal combustion engine, it is necessary to obtain accurate information about the air mass available for combustion. Based on the available air mass, it is possible to infer the available oxygen, which is necessary for the combustion of the fuel injected into the cylinders. Furthermore, the air mass flowmeter 2 in FIG. 1 has a first temperature sensor element 7 and a second temperature sensor element 8. The first temperature sensor element 7 and the second temperature sensor element 8 are arranged at different locations in the air-guiding path 20. The temperature sensor elements 7, 8 are generally formed from resistors or thermopiles, which assume different resistance values according to the temperature prevailing at the temperature sensor element. A heating element 12 is formed between the first temperature sensor element 7 and the second temperature sensor element 8. The air mass stream 10 that enters the housing 3 of the air mass flowmeter 2 through the inlet opening 4 flows firstly over the first temperature sensor element 7 and then over the heating element 12 in the air-guiding path 20, after which the air mass stream 10 reaches the second temperature sensor element 8 and is directed along the auxiliary pipe 5 to the outlet opening 6 of the air mass flowmeter 2. The air mass stream 10 reaches the first temperature sensor element 7 at a certain temperature. The temperature is detected by the first temperature sensor element 7. The air mass stream 10 then passes over the heating element 12, wherein the air mass stream 10 is heated to a greater or lesser extent according to the mass flowing past. When the heated air mass stream 10 reaches the second temperature sensor element 8, the temperature of the air mass stream 10 which then prevails is determined by way of the second temperature sensor element 8. The air mass that has flowed past can be determined from the difference between the temperatures measured by the first temperature sensor element 7 and by the second temperature sensor element 8. For this purpose, the air mass flowmeter 2 itself may contain a circuit carrier 13 fitted with electronic components that evaluate the measurement signals of the first temperature sensor element 7 and the second temperature sensor element 8 and which, if it is desired, are also able to further process said signals. The information about the air mass stream 10 gained in this way is passed on to an engine controller (not illustrated here), which is able to ensure an optimal fuel-air mixture in the cylinders of the internal combustion engine.

Figure 2:
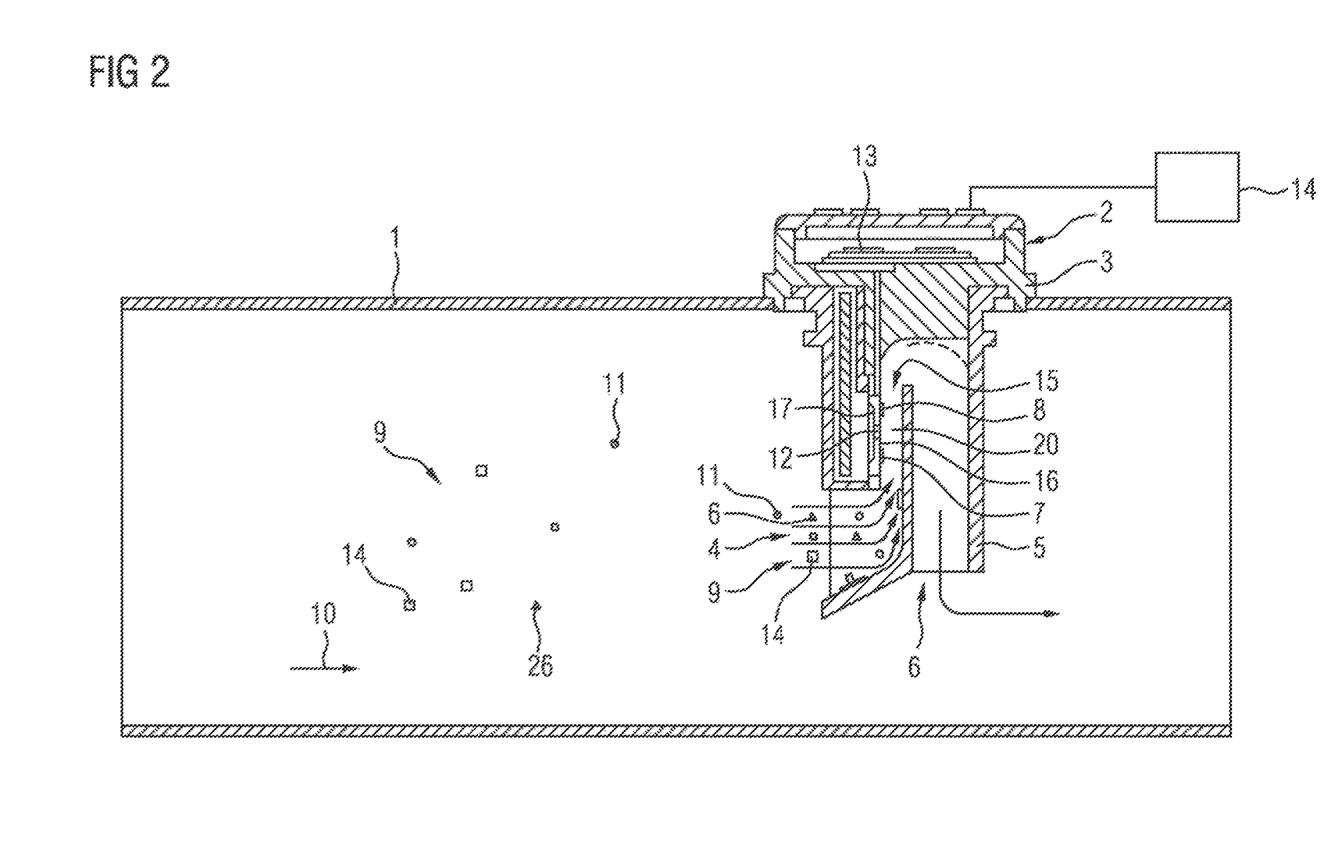
FIG. 2 is a sensor element, in the form of a microelectromechanical system (MEMS), in an air mass flowmeter integrated in an intake pipe as an insertion finger.

FIG. 2 shows the air mass sensor element 15, which is in the form of a microelectromechanical system (MEMS), in an air mass flowmeter 2, which is integrated in an intake pipe 1 as an insertion finger. Here too, the air mass stream 10 reaches the inlet opening 4, and enters firstly the air-guiding path 20 and then the auxiliary pipe 5. The first temperature sensor element 7 and the second temperature sensor element 8 can be seen in the air-guiding path 20 on the surface 16 of a diaphragm 17. The heating element 12 is arranged between the first temperature sensor element 7 and the second temperature sensor element 8. The air mass stream 10 firstly reaches the first temperature sensor element 7, then flows over the heating element 12 in order to subsequently reach the second temperature sensor element 8. The air mass sensor element 15 has to be arranged in a highly accurate manner in the air-guiding path 20 because even small deviations from the intended position lead to significantly distorted measurement results.

It can furthermore be seen in FIG. 2 that the air mass stream 10 can also contain impurities 9. For example water droplets 26, oil droplets 11 and/or dust particles 14, are transported by the air mass stream 10 to the air mass flowmeter 2. The impurities 9 pass through the inlet opening 4 of the air mass flowmeter 2 to the air mass sensor element 15 in the air-guiding path 20. If the impurities are deposited in the region of the first temperature sensor element 7 and of the second temperature sensor element 8, a substantial distortion of the measurement value for the air mass stream 10 can occur over time. Since said distortion builds up more and more as a result of the accumulation of the impurities on the air mass sensor element 15 over a long period of time, reference is also made in this connection to a signal drift of the air mass flowmeter 2. The signal drift can at least be minimized by accurate positioning of the air mass sensor element 15 in the air-guiding path 20.

Figure 3:
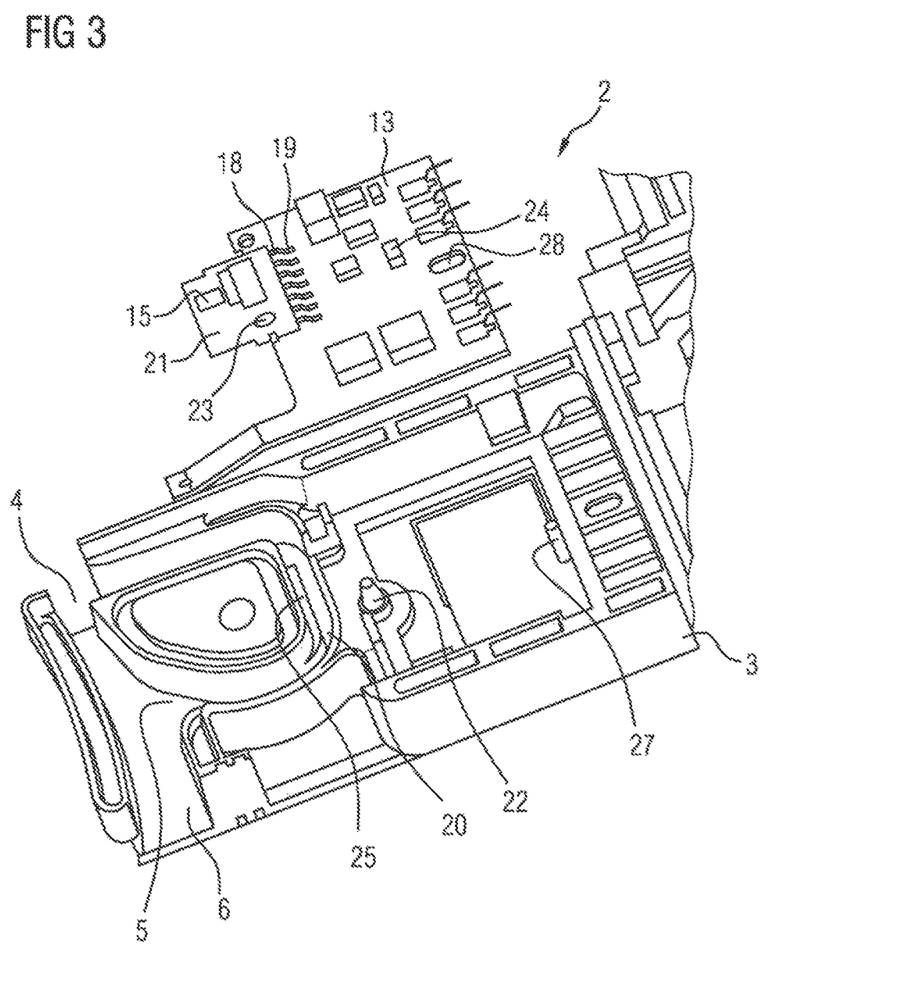
FIG. 3 is an air mass flowmeter.

FIG. 3 shows an air mass flowmeter 2 according to the invention. The air mass flowmeter 2 has a housing that may be produced for example from a plastic in an injection-molding process. The housing exhibits an inlet opening 4 into which an air stream 10 can enter, wherein a part of the air stream which has entered flows via the bypass of Ω-shaped form and, in the process, flows over the air mass sensor element 15 along the air-guiding path 20. The air stream that has flowed past the air mass sensor element 15 passes to the outlet opening 6 via the auxiliary pipe 5. A circuit carrier 13 is arranged in the housing 3 of the air mass flowmeter 2. The circuit carrier 13 may be a printed circuit board or lead frame. Arranged on the circuit carrier 13 are electronic components 24 which, for example, amplify and/or process the signals generated by the air mass sensor element 15. For this purpose, a sensor element carrier 21, to which the air mass sensor element 15 is fitted, for example by encapsulation, is electrically connected to the circuit carrier 13 with the aid of connection wires 18 and connection pads 19. The air mass sensor element 15 is arranged on or in the sensor element carrier 21. The air mass sensor element 15 has to be arranged very precisely in the air-guiding path 20 of the air mass flowmeter 2. For high-precision arrangement of the air mass sensor element 15, the housing 3 of the air mass flowmeter 2 has a positioning element 22. The positioning element 22 may be formed integrally with the housing 3 of the air mass flowmeter 2. The positioning element 22 engages into a positioning element receptacle 23. In FIG. 3, the positioning element receptacle 23 is a bore in the sensor element carrier. The positioning element 22 and the positioning element receptacle 23 ensure highly accurate positioning of the air mass sensor element 15 in the air-guiding path 20. Furthermore, a sensor element carrier support 25 which likewise serves for the positioning of the air mass sensor element 15 in the air-guiding path 20 can be seen in FIG. 3. With the aid of the three elements positioning element 22, positioning element receptacle 23 and sensor element carrier support 25, it is possible to realize extremely precise positioning of the air mass sensor element 15 in all three spatial dimensions within the air-guiding path 20. This highly accurate positioning of the air mass sensor element 15 in the air-guiding path 20 ensures error-free and accurate detection of the air mass steam by the air mass flowmeter 2.

Figure 4:
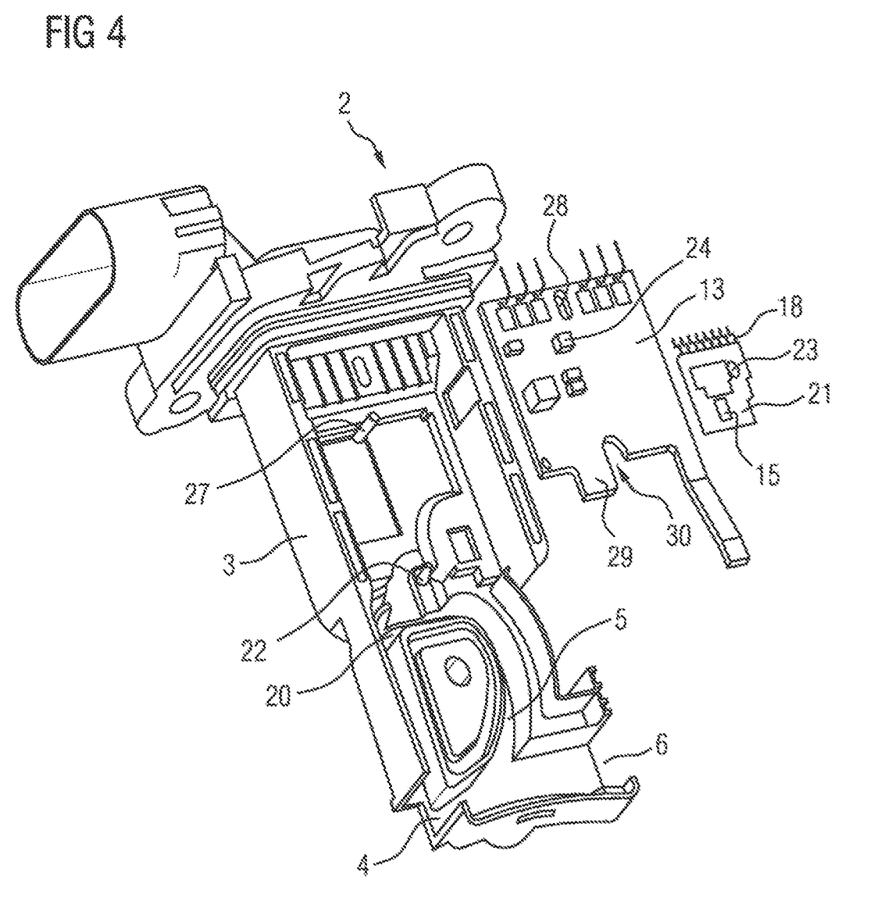
FIG. 4 is, from another perspective, the air mass flowmeter from FIG. 3.

FIG. 4 shows the air mass flowmeter 2 known from FIG. 3 from another perspective. Here too, the housing 3 of the air mass flowmeter can be seen, there being arranged in said housing the circuit carrier 13 and the sensor element carrier 21 with the air mass sensor element 15. In FIG. 4, a circuit carrier positioning element 27 can be seen in addition to the features known from FIG. 3. The circuit carrier positioning element 27 ensures reliable positioning of the circuit carrier 13 in the housing 3 of the air mass flowmeter 2 independently of the positioning element 22 for positioning the sensor element carrier 21. In particular, it is possible for rotational fixing (rotation prevention) of the circuit carrier 13 and thus also of the sensor element carrier 21 to be realized by way of the circuit carrier positioning element 27. The circuit carrier 13 and the sensor element carrier 21 are electrically connected with the aid of connection wires 18 and connection pads 19. A direct mechanical connection of the circuit carrier 13 to the sensor element carrier 21 is not realized. Alternatively, the sensor element carrier 21 may be fitted to the circuit carrier 13 at a fastening region 29 (see FIG. 4) provided on the circuit carrier 13, for example by adhesive bonding. In order that the positioning element 22 can come into engagement with the positioning element receptacle 23, the circuit carrier 13 has a recess 30 in which, in the fitted state of the sensor element carrier 21 at the circuit carrier 13, the positioning element 22 is arranged.

Both the circuit carrier 13 and the sensor element carrier 21 are directly connected to the housing 3 of the air mass flowmeter 2. The mechanical independence of the sensor element carrier 21 from the circuit carrier 13 permits high accuracy in the positioning of the air mass sensor element 15 in the air-guiding path 20. This is attributed primarily to the fact that the circuit carrier 13 is generally in the form of a printed circuit board or lead frame, wherein both configurations of the circuit carrier 13 have large mechanical tolerances, which lie in the region of several 100 μm. By contrast, the sensor element carrier 21 is designed as a highly precise component and is thus correspondingly expensive. Compared with the circuit element carrier, the sensor element carrier 21 has much smaller mechanical tolerances, which lie in the region of 10 μm. Since only the sensor element carrier 21 is of importance for the positioning of the air mass sensor element 15, it is possible to work with relatively inexpensive elements in the case of the circuit carrier 13. This leads to an inexpensive design of the air mass flowmeter 2, wherein extremely high measurement accuracy of the air mass flowmeter 2 is maintained.

Figure 5:
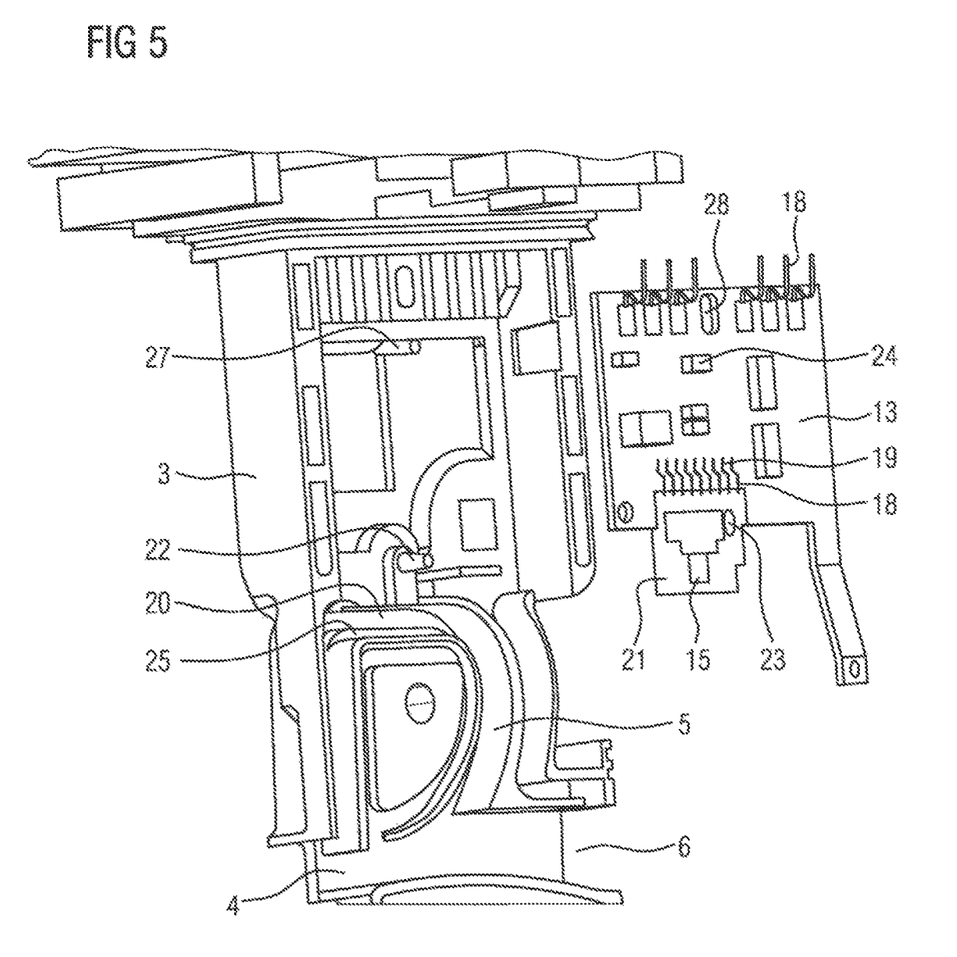
FIG. 5 is the air mass flowmeter with its housing.

FIG. 5 shows the air mass flowmeter 2 according to the invention with its housing 3 and the circuit carrier 13. Arranged on the circuit carrier 13 are electronic components 24 that process the signals of the air mass sensor element 15. The circuit carrier 13 is electrically connected to the air mass sensor element 15, arranged on the sensor element carrier 22, with the aid of connection pads 19 and connection wires 18. There is no direct mechanical connection between the air mass sensor element 15 and the circuit carrier 13. The positioning of the air mass sensor element 15 in the air-guiding path 20 is again realized with the aid of the positioning element 22 which engages into a positioning element receptacle 23. In this example, the positioning element 22 is in the form of a peg on the housing 3 of the air mass flowmeter 2. In this example, the positioning element receptacle 23 is in the form of a bore in the sensor element carrier 21. However, it is equally conceivable for the positioning element 22 to be for example in the form of a peg on the sensor element carrier 21, which peg engages into a positioning element receptacle 23 which is in the form of a bore in the housing 3 of the air mass flowmeter 2. The positioning element receptacle 23 can be produced as a bore with very high precision. Such bores are simple and inexpensive to make. The positioning element 22 may either be formed integrally with the housing 3 of the air mass flowmeter 2 or be formed integrally with the sensor element carrier 21.

Figure 6:
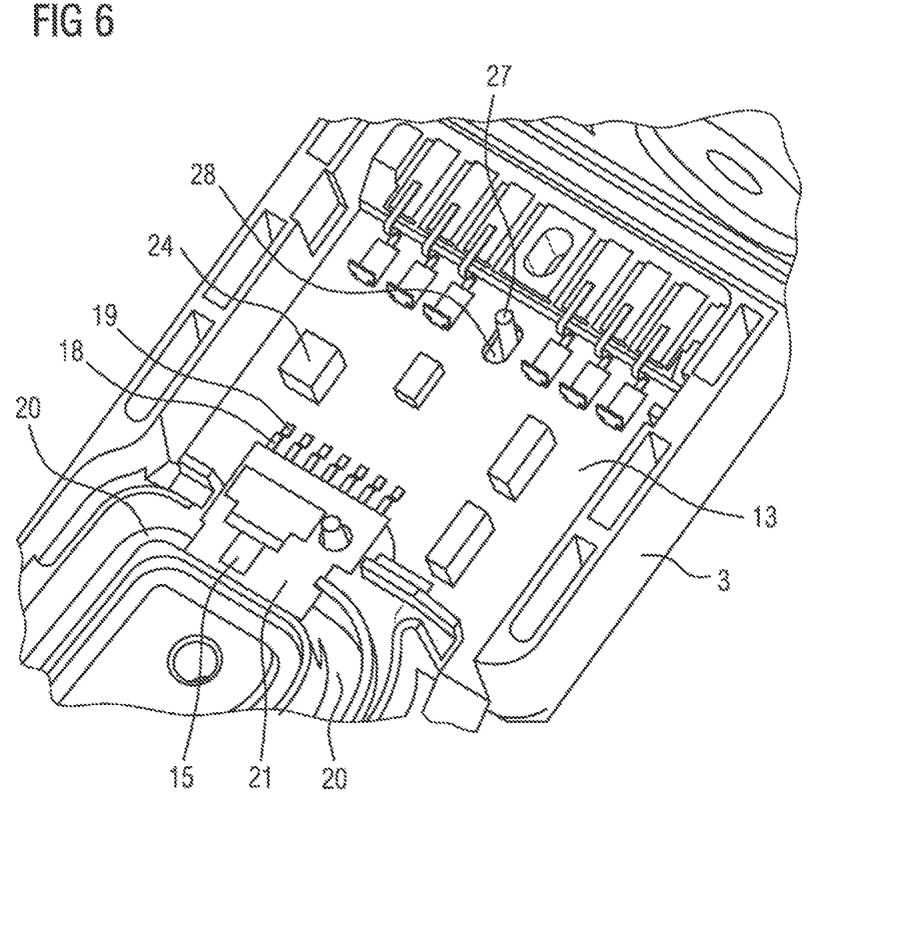
FIG. 6 is from another perspective, the air mass flowmeter with its housing.
Figure 7:
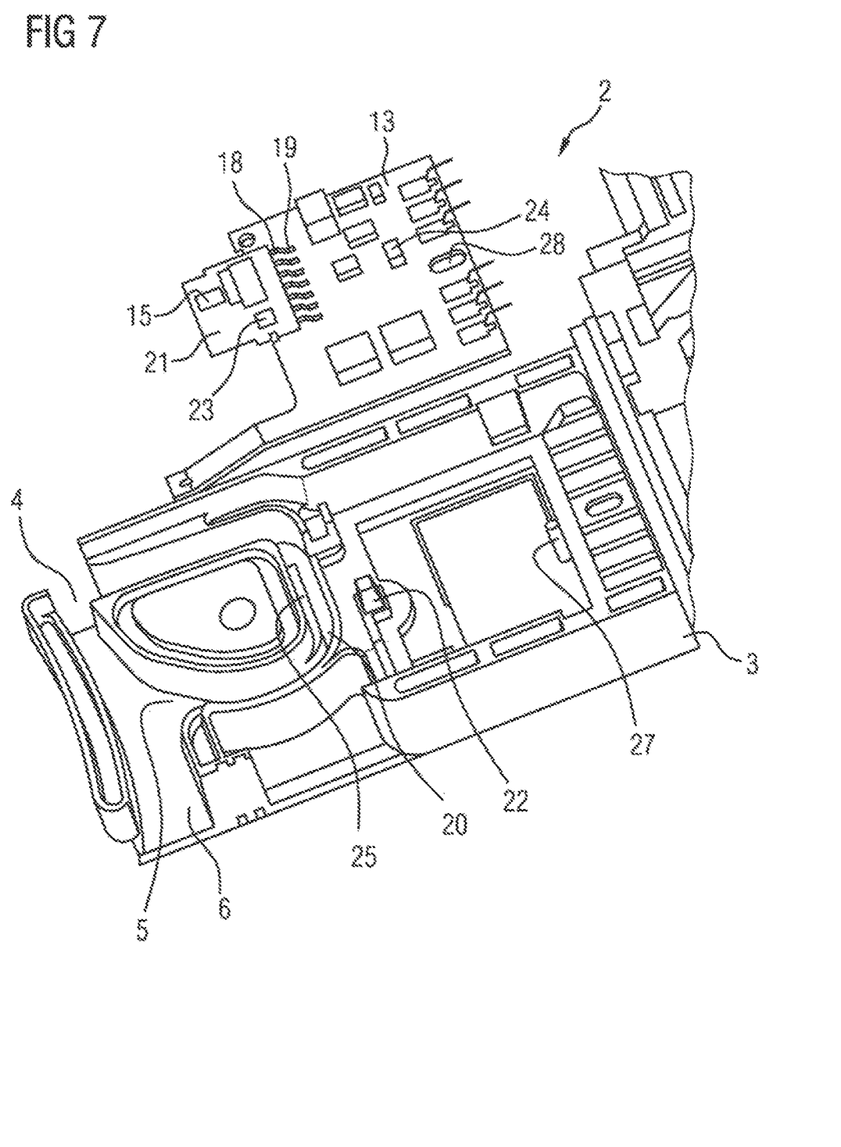
FIG. 7 is a further air mass flowmeter.
Figure 8:
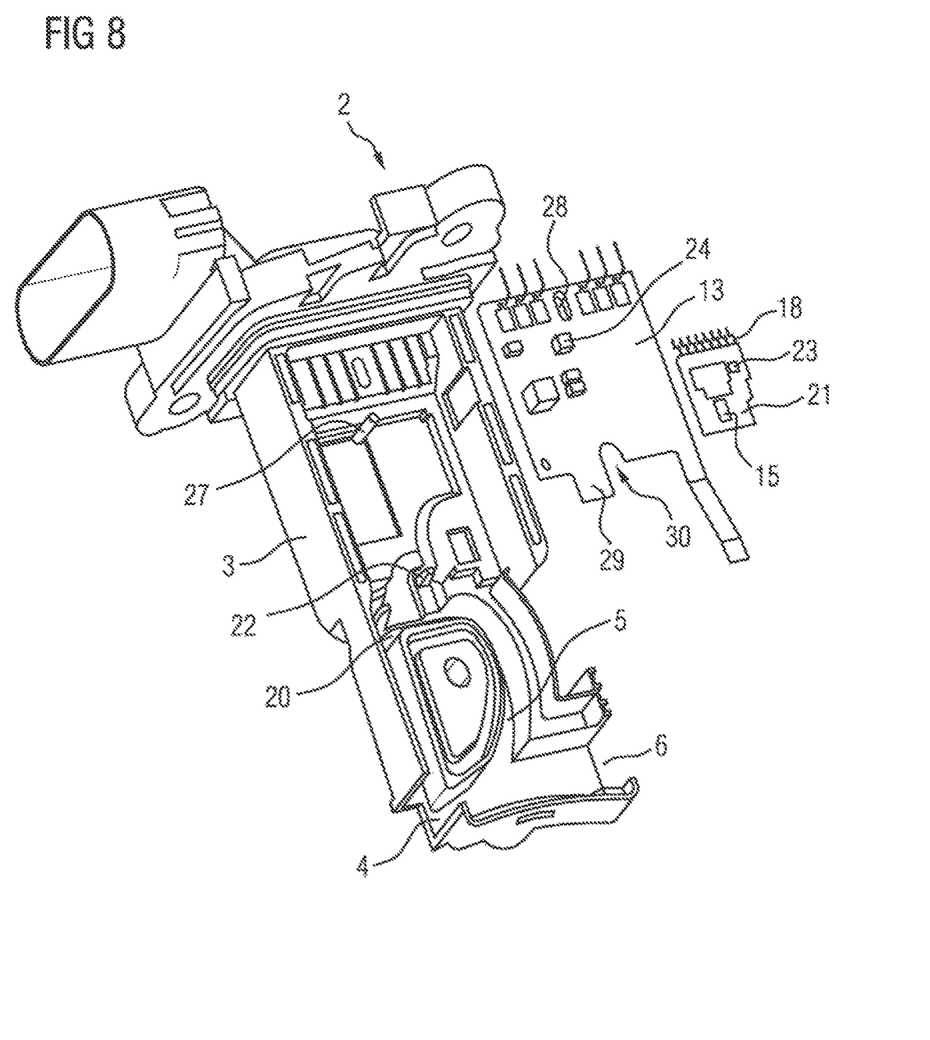
FIG. 8 is, from another perspective, the air mass flowmeter from FIG. 7.
Figure 9:
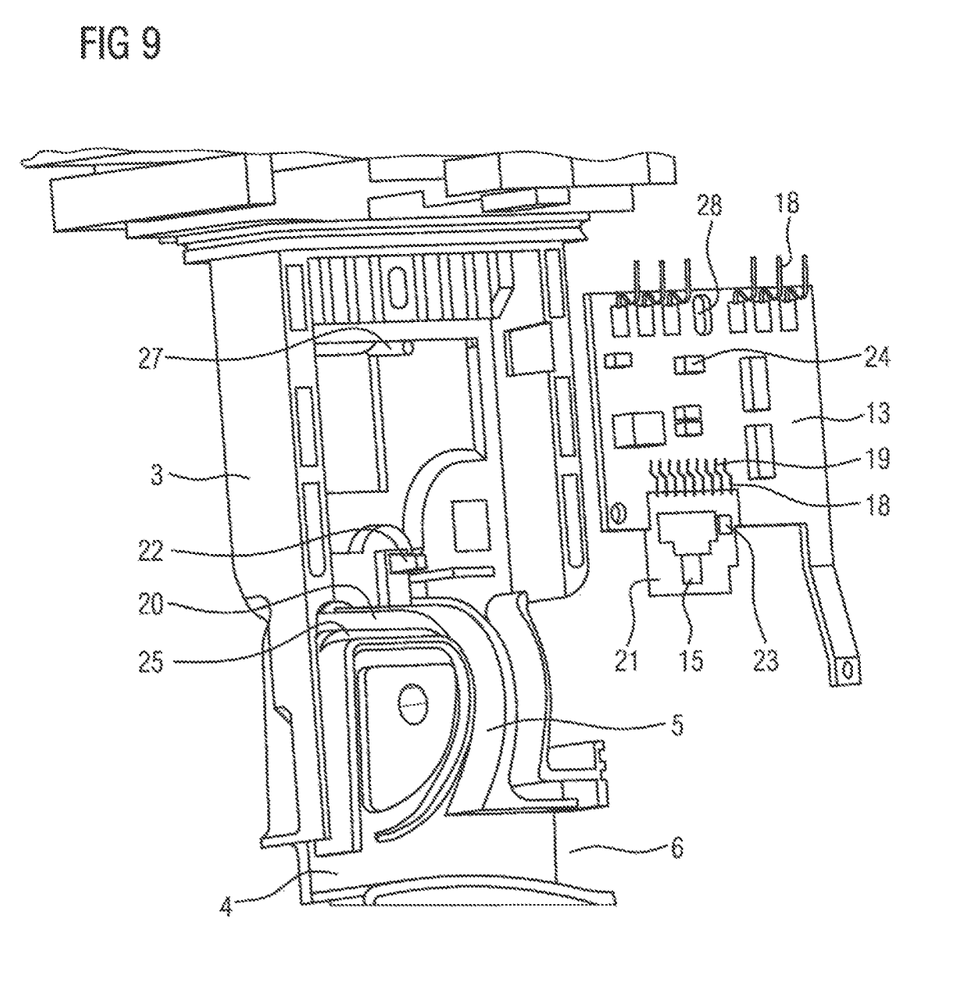
FIG. 9 is the air mass flowmeter with its housing.
Figure 10:
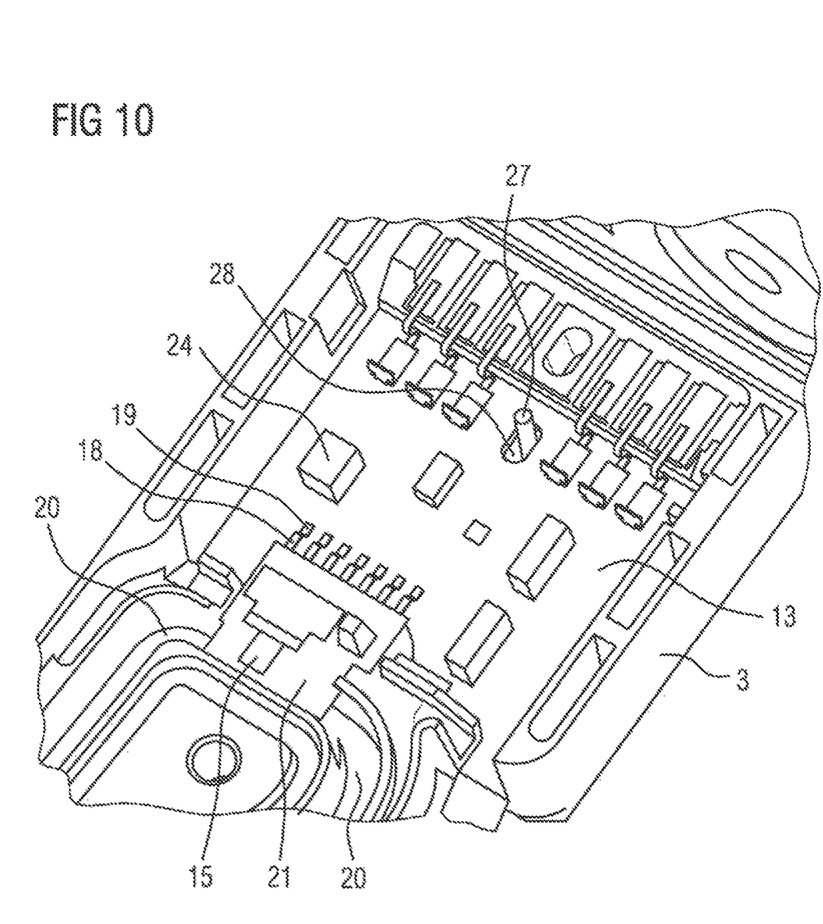
FIG. 10 is from another perspective, the air mass flowmeter.

FIG. 6 shows the air mass flowmeter 2 with the housing 3, there being installed in the latter both the circuit carrier 13 and the positioning element 22 with the air mass sensor element 15. It can clearly be seen that the positioning element 22 engages into the positioning element receptacle 23 in the sensor element carrier 21. Consequently, the air mass sensor element 15 is positioned highly accurately in two spatial dimensions in the air-guiding path 20. The positioning of the air mass sensor element 15 in the third spatial dimension in the air-guiding path 20 is realized by the support of the sensor element carrier 21 on the sensor element carrier support 25 and a press fit provided between the positioning element 22 and the positioning element receptacle 23. The sensor element carrier support 25 can be seen clearly in FIG. 5 and is covered by the sensor element carrier 21 in FIG. 6. With the aid of the highly precisely produced sensor element carrier 21, the positioning element 22, the positioning element receptacle 23 and the sensor element carrier support 25, it is possible to position the air mass sensor element 15 highly precisely in all three spatial dimensions in the air-guiding path 20. This highly precise positioning of the air mass sensor element 15 leads to highly accurate measurement results of the air mass flowmeter 2. With the aid of a circuit carrier positioning element 27, which is formed on the housing 3 of the air mass flowmeter 2, the circuit carrier is positioned too. For this purpose, the circuit carrier positioning element 27 engages into a receptacle 28 for the circuit carrier positioning element 27. The receptacle 28 for the circuit carrier positioning element 27 may be in the form of a bore or, as illustrated in FIG. 6, as a slot in the circuit carrier 13.

It can again be seen in FIG. 6 that the sensor carrier element 21 is electrically connected to the circuit carrier 13 with the aid of connection wires 18 and connection pads 19. This allows the signals generated by the air mass sensor element 15 to be transmitted electrically to the circuit carrier 13 and to the electronic components 24 arranged on the circuit carrier 13. However, there is no direct mechanical connection between the circuit carrier 13 and the sensor element carrier 21, which contributes to the highly accurate positioning of the air mass sensor element 15 in the air-guiding path 20. Alternatively, there may be a mechanical connection between the circuit carrier 13 and the sensor element carrier 21.

FIGS. 7 to 10 show a further configuration of an air mass flowmeter according to the invention. The configuration illustrated in FIGS. 7 to 10 differs from the configuration illustrated in FIGS. 3 to 6 in that, firstly, the positioning element 22 is formed as a conical peg having a substantially square cross section, and in that, secondly, there is a mechanical connection, in the form of adhesive bonding, between the circuit carrier 13 and the sensor element carrier 21.

According to FIGS. 7 to 10, the sensor element carrier 21 is fitted to the circuit carrier 13 at a fastening region 29 (see FIG. 4) provided on the circuit carrier 13, for example by adhesive bonding. In order that the positioning element 22 can come into engagement with the positioning element receptacle 23, the circuit carrier 13 has a recess 30 through which, in the fitted state of the sensor element carrier 21 at the circuit carrier 13, the positioning element 22 extends in order to engage with the positioning element receptacle 23.

As already mentioned, the positioning element 22 has a cross section which is preferably formed to provide rotation prevention of the sensor element carrier 21 relative to the circuit carrier when the positioning element 22 is in engagement with the positioning element receptacle 23. With this engagement, there is preferably at least partially a press fit between the positioning element 22 and the positioning element receptacle 23. It is thus possible by such an engagement of the positioning element 22 with the positioning element receptacle 23 for both all the translational degrees of freedom of the sensor element carrier 21 relative to the circuit carrier 13 and also at least one rotational degree of freedom of the sensor element carrier 21 relative to the circuit carrier 13, namely the rotation of the sensor element carrier 21 relative to the circuit carrier 13 about an axis which runs substantially parallel to the axis of extent of the positioning element 22, to be blocked. In particular, it is possible for the press fit between the positioning element 22 and the positioning element receptacle 23 to prevent the sensor element carrier 21 moving in a translational direction along the axis of extent of the positioning element 22.

For the purpose of blocking the sensor element carrier 21 relative to the circuit carrier 13 about the remaining two degrees of freedom, the circuit carrier positioning element 27 which has already been described with reference to FIGS. 3 to 6 can be provided.

In the configurations in FIGS. 7 to 10, the positioning element 22 has a conical form and has a substantially square cross section. In further configurations according to the invention, it is possible for the positioning element 22 to have an oval, triangular or polygonal cross section. The positioning element receptacle 23 has a cross-sectional form which substantially corresponds to the cross-sectional form of the positioning element 22 such that, after the positioning element 22 has been brought into engagement with the positioning element receptacle 23, a press fit is present therebetween. In said fitted state, it is also the case that the sensor element carrier 21 is in contact with the sensor element carrier support 25, with the result that the sensor element carrier 21, or more precisely the air mass sensor element 15, is positioned relative to the air-guiding path 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An air mass flowmeter comprising:
an air mass sensor element;
a housing having:
an air-guiding path in which the air mass sensor element is arranged; and
a tapered positioning element formed on the housing;
a sensor element carrier arranged in the housing and on which the air mass sensor element is arranged;
a circuit carrier arranged in the housing to which the an air mass sensor element is electrically connected to via connection wires; and
a positioning element receptacle formed in the sensor element carrier and configured to directly engage with the tapered positioning element formed on the housing as a result of which the air mass sensor element is precisely positioned in the air-guiding path, wherein the positioning element receptacle is spaced inboard from an edge of the sensor element carrier.

2. The air mass flowmeter as claimed in claim 1, wherein the positioning element is formed integrally with the housing.

3. The air mass flowmeter as claimed in claim 2, wherein the positioning element receptacle is a bore in the sensor element carrier.

4. The air mass flowmeter as claimed in claim 1, wherein the positioning element receptacle is a bore in the sensor element carrier.

5. The air mass flowmeter as claimed in claim 1, wherein the positioning element has a cross section which is one of triangular, oval, square, and polygonal.

6. The air mass flowmeter as claimed in claim 1, wherein the positioning element is substantially conical.

7. The air mass flowmeter as claimed in claim 1, wherein a press fit is at least partially provided between the positioning element and the positioning element receptacle when the positioning element and the positioning element receptacle are in engagement.

8. The air mass flowmeter as claimed in claim 1, wherein a production tolerance of the sensor element carrier is smaller than a production tolerance of the circuit carrier.

9. The air mass flowmeter as claimed in claim 1, wherein circuit carrier and the sensor element carrier are directly connected to the housing.

10. The air mass flowmeter as claimed in claim 1, wherein engagement of the tapered positioning element and the positioning element receptacle position the sensor element carrier is in all translational directions.

11. The air mass flowmeter as claimed in claim 1, wherein the air-guiding path is arranged in the housing and comprises at least two parallel paths that are substantially perpendicular to an input of the air-guiding path.

12. The air mass flowmeter as claimed in claim 1, wherein the air-guiding path is substantially omega shaped.

13. The air mass flowmeter as claimed in claim 1, further comprising a mechanical connection between the circuit carrier and the sensor element carrier.

14. The air mass flowmeter as claimed in claim 1, wherein:
the sensor element carrier is in direct contact with the housing; and
the circuit carrier is in direct contact with the housing.

15. An air mass flowmeter comprising:
an air mass sensor element;
a housing having:
an air-guiding path in which the air mass sensor element is arranged; and a positioning element receptacle formed on the housing;

a sensor element carrier arranged in the housing and on which the air mass sensor element is arranged;

a circuit carrier arranged in the housing to which the an air mass sensor element is electrically connected to via connection wires; and a tapered positioning element formed on the sensor element carrier and configured to directly engage with the positioning element receptacle formed on the housing as a result of which the air mass sensor element is precisely positioned in the air-guiding path, wherein the tapered positioning element is spaced inboard from an edge of the sensor element carrier.

16. The air mass flowmeter as claimed in claim 15, wherein the positioning element is formed integrally with the sensor element carrier.

17. The air mass flowmeter as claimed in claim 16, wherein the positioning element receptacle is a bore in the housing.

18. The air mass flowmeter as claimed in claim 15, wherein the positioning element receptacle is a bore in the housing.

19. The air mass flowmeter as claimed in claim 15, wherein the positioning element has a cross section which is one of triangular, oval, square, and polygonal.

20. The air mass flowmeter as claimed in claim 15, wherein the positioning element is substantially conical.

21. The air mass flowmeter as claimed in claim 15, wherein a press fit is at least partially provided between the positioning element and the positioning element receptacle when the positioning element and the positioning element receptacle are in engagement.

* * * * *